May 29, 1956 J. BORDE Re. 24,160

BURNER STRUCTURE

Original Filed July 17, 1950

INVENTOR.
JOSEF BORDE
BY Leon M. Strauss
Agt.

United States Patent Office

Re. 24,160

Reissued May 29, 1956

24,160

BURNER STRUCTURE

Josef Borde, Zurich, Switzerland

Original No. 2,637,378, dated May 5, 1953, Serial No. 174,331, July 17, 1950. Application for reissue March 31, 1954, Serial No. 420,226. In Switzerland July 20, 1949

8 Claims. (Cl. 158—63)

Matter enclosed in heavy brackets [ ] appears in the original patent but forms no part of this reissue specification; matter printed in italics indicates the additions made by reissue.

This invention relates to burner structures, in particular to burners for kitchen and similar appliances which may even be used outdoors or in the field (for camping or military purposes).

It is one of the primary objects of this invention to provide means affording marked efficiency and safe operation of a burner of the aforesaid type.

It is another object of the present invention ensuring increased speed in the operation of the burner and accurate regulation of the flame thereof.

Still another object of the invention is to provide means facilitating closure of the nozzle device of the burner in a rapid and safe manner and during operation of the burner, if desired.

It is a further object of the invention to provide means conducive to a strong and durable burner structure which may be permanently joined to the fuel housing and forms a unitary construction with the nozzle or jet device.

Further objects of the present invention include improvements in simplicity and economy of construction, great adaptability to different fields of use and reduction of the number of parts of which the burner consists, so that the same takes up a minimum of space, becomes compact, may be readily installed and enhances its saleable and commercial possibilities.

Still another object of the invention is to provide means contributing to considerable improvement in burner structures, the new burner being light in weight, cheap to manufacture and being easily assembled and disassembled.

With the above and other objects in view, the invention will be hereinafter more fully described and the combination and arrangement of parts will be shown in the accompanying drawing and pointed out in the claims which form part of the specification.

Figure 1:
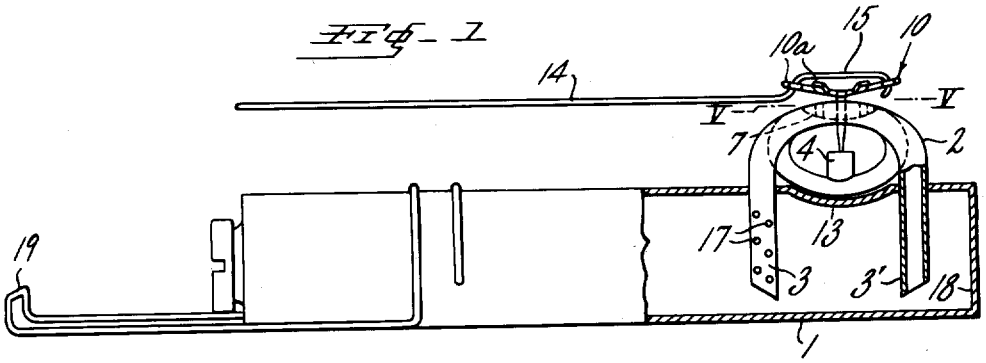
Fig. 1 is a side view of the burner embodying the invention, a part of the burner being shown in section.

Referring now more particularly to the drawing, there is shown a burner embodying the invention, which is provided with a housing 1 adapted to contain a liquid fuel. This housing 1 is preferably of cylindrical form. Adjacent one end of said housing there is disposed a spiral-shaped tube body 2 which is oval in cross-section and which extends with its ends 3, 3' through suitable openings in the wall of housing 1 into the interior of the latter. At the location of penetration of the tube ends 3, 3' the latter are affixed to the housing wall, as by soldering, so as to obtain a fluid-tight joint thereat.

The spirally shaped portion of the tube body 2 supports a nozzle body 4 whose *discharge or* nozzle opening 5 communicates with the interior of the tube body 2. Above nozzle body 4 there is affixed in any appropriate manner to the tube body 2 and between oppositely disposed convolutions or coils of the latter a *guiding* plate member 7 *which may be* provided with a plurality of openings 6. This platen member 7 has in its center a threaded opening or perforation. Through this opening 8 threadedly extends a jet needle or *valve stem, such as* pin 9, which supports at its upper end a slightly conical disc element having spider arms 10a.

This jet needle 9 has a conical portion 11 which coacts with the suitably shaped end of nozzle opening 5 and which is adapted to close the latter when the needle 9 threadedly engages plate 7 at opening 8 and is rotated by means of arms 10a of disc 10.

Figure 3:
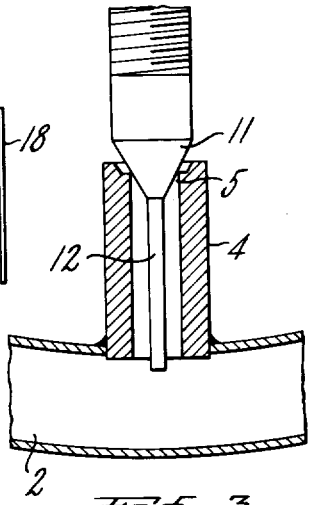
Figs. 3 and 4 show on an enlarged scale two different fragmentary longitudinal sectional views of the nozzle or jet device with the lower end of the jet needle.
Figure 4:
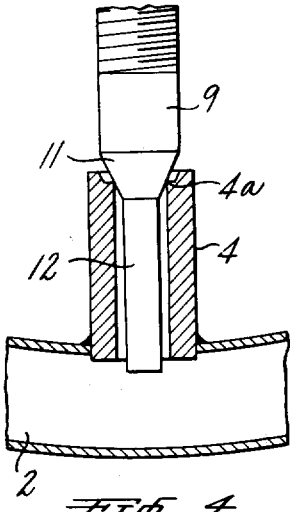
Figure 5:
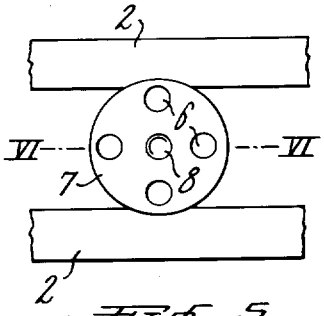
Fig. 5 is a fragmentary top plan view taken along the line V—V of Fig. 1 showing the plate member supporting the jet needle.
Figure 6:
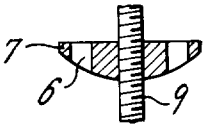
Fig. 6 is a longitudinal sectional view of the plate member and needle, taken along the line VI—VI of Fig. 5.

The lower end portion of the jet needle 9 [is] *may be* provided with a substantially flat end 12 rectangular in shape (Figs. 3 and 4), the width of said flat end being somewhat smaller than the diameter of the nozzle opening 5, so that when needle 9 is turned or rotated, the relatively sharp edges of needle end 12 will contact and scrape the inner wall 4a of the nozzle opening 5, thus freeing the same from any adhering impurities or fuel waste deposits.

In order to operate the burner, needle 9 is first moved in upward direction and relative to plate 7, whereby the conical needle portion 11 will provide a predetermined space at the nozzle opening. Thereafter, any suitable liquid fuel, as for instance gasoline, is allowed to accumulate within the curved recess or cup-shaped part 13 of the wall of the housing 1 which is located below the spiral convolutions of the tube 2 and then ignited. The tube body 2 is thus heated and due to convection of heat through the metal of the tube body 2, the fuel within the end portions 3, 3' of the tube 2 will also be heated and subjected to gasification.

Fuel gas then starts to flow through the tube 2 to nozzle 4 from where the gas escapes and is there ignited by the burning flame at this part of the burner. Due to steadily increasing temperature of the tubular body 2 caused by contact with the flame, gasification of the liquid fuel present in the tube ends 3, 3' will be continuously accelerated and expedited.

The gas escaping from the end of nozzle 4 [passes from below partly through the openings 6 of plate 7 and] will [also] be diverted [partly] by the curved *or bulging* underface of plate 7 in outward direction, so that the created flame of the burner will assume a certain width, thus always remaining in contact with both convolutions or coils of the tube body 2, which, consequently, become considerably heated, so that the ends 3, 3' of the tube body which are in contact with the fuel in the housing will maintain and continue gasification of the fuel.

The gas which ascends through the holes or openings 6 [of], *when provided in* the plate 7, is collected or caught within the upper disc element 10, so that the gas upon impingement upon disc or plate surface 10 is intimately mixed with air and will be completely burned.

A wire piece 14 having hook-shaped ends 15 can be brought into engagement with notches 16 of disc plate 10, so that the latter may be turned together with jet needle 9 which can be adjusted in its position relative to opening 5 even during operation of the burner. Conical needle portion 11 may thus close more or less the aforesaid opening whereby the intensity of the flame may be easily regulated.

The cross-section of the tubular body 2 [is] *may be* oval or elliptical, the body being at least partly flattened, to obtain a relatively narrow cross-section for the passage of the fuel and further intimate contact of the fuel gas when it ascends from the ends 3, 3' of the tube body 2 with the heated walls of the latter. In this manner, complete gasification of the fuel takes place and only fuel, which is entirely transformed into gas reaches carburetor nozzle 4.

Figure 2:
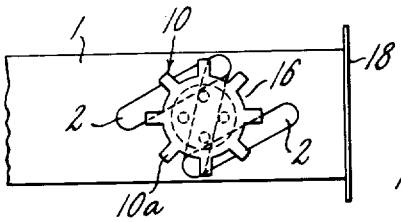
Fig. 2 is a fragmentary top plan of the burner housing equipped with a nozzle or jet device.

In the ends 3, 3' of the tubular body 2 there are provided a plurality of perforations 17 through which in accordance with the consumption or delivery of fuel from housing 1, air entering nozzle 4 may flow into said housing. The end wall 18 of the cylindrical housing extends at both sides beyond said housing (see Fig. 2) so that the latter cannot be tipped or tilted when in position of operation.

A wire or like stirrup 19 held on and coiled with its end around housing 1 may be employed as a handle for manipulating the burner or to place the latter in operative position within a cooking utensil or any other suitable appliance.

It can thus be seen that there has been provided in accordance with this invention a compact and efficient burner structure for liquid fuel to be gasified, said burner being characterized by a tubular body terminating in two legs having open ends, said tubular body including coil means extending intermediate said two legs, and a jet or nozzle device seated on said coil means and in communication with the interior of said tubular body, said legs being adapted to extend into a fuel supply housing, whereby said open ends establish connection between said fuel supply housing and said jet device.

While one embodiment of the invention has been shown and described, it will be easily understood that the same is capable of modification without departure from the general scope and spirit of the invention as defined in the claims.

*Throughout the specification and claims, the disposition of the various elements has been set forth in reference to the normal operating position, as shown in Fig. 1.*

Having thus described the invention, what is claimed as new and desired to be secured by Letters Patent is:

1. A burner structure for gasifiable fuel comprising a housing adapted to contain said fuel, a tubular body seated on said housing, a nozzle arranged on said tubular body, said tubular body terminating in two end portions extending into said housing and connected with the latter whereby the interior of said housing communicates through said tubular body with said nozzle, needle means in operative connection with and movable relatively to said nozzle, a plate member supporting said needle means and guiding the same, said plate member being provided with a plurality of openings for diverting fuel gas emanating from said nozzle, and an end disk affixed to said needle means above said plate member and forming baffle means against which said fuel gas may be impinged for intimate mixture with air, whereby a combustible air-fuel mixture for ignition is constituted, said end disk including arms, [said arms being rotatable] *for rotating the latter* to actuate said needle means and to move the same through said plate member and relatively to said nozzle.

2. A burner structure according to claim 1, wherein said tubular body includes a spiral-shaped portion, which is positioned intermediate said end portions of said tubular body, said housing being provided with a recess for engagement with said spiral-shaped portion.

3. A burner structure according to claim 2, wherein said nozzle is arranged for support on said spiral-shaped portion and communicates with the interior of same.

[4. A burner structure according to claim 1, wherein said openings of said plate member are concentrically arranged with respect to said needle means, to thereby intensify diversion of fuel gas emanating from said nozzle.]

[5. A burner structure according to claim 1, including a rectangular-shaped end portion connected to said needle means and adapted to engage the inner wall of said nozzle when said needle means is rotated.]

[6. A burner structure according to claim 1, wherein said end portions are provided with perforations to facilitate contact of said tubular body with a larger surface of said fuel when contained in said housing.]

[7. A burner structure according to claim 1, wherein the cross-section of said tubular body is oval-shaped.]

8. A burner structure according to claim 1, wherein said tubular body includes a plurality of coils extending in a horizontal direction with respect to said end portions and seated on said housing.

*9. A burner structure for a gasifiable fuel, said structure comprising a housing adapted to contain said fuel, a coiled tube having ends secured to and extending downwardly into said housing, respectively, and being further provided with a first portion, a second portion and a third portion, said first portion and said second portion being horizontally spaced and extending above said third portion, a nozzle having an upwardly directed discharge opening and connected to said third portion for communication with said housing, an element cooperable with said nozzle for controlling fuel flow through said discharge opening, a stem extending upwardly from said element, guiding means secured to and positioned between said first and second spaced portions above said nozzle, said guiding means having an opening into which said stem extends and interengageable formations disposed on said stem and said guiding means, respectively, for supporting said stem relative to said guiding means and for effecting adjustment of said element relative to said nozzle upon movement of said stem relative to said guiding means, said guiding means spreading the flame produced by burning said fuel and directing said flame toward said first and second spaced tube portions for heating the latter.*

*10. A burner structure for a gasifiable fuel, said structure comprising a housing adapted to contain said fuel, a coiled tube disposed above said housing, said tube having two ends secured to and extending downwardly into said housing at horizontally spaced points and having a spiral-like configuration between said ends, the mid-portion of said coiled tube being disposed adjacent said housing between said ends, each length of said tube between said mid-portion and an end of said tube comprising a loop extending upwardly from said mid-portion and said tube end with the upper portions of the two loops being horizontally spaced, a nozzle on said mid-portion of said coiled tube and having an upwardly directed discharge opening communicating with the interior of said housing through said two loops and ends of said coiled tube, a valve element cooperable with said nozzle for controlling fuel flow therethrough, said valve element having a stem extending upwardly between said spaced upper portions of said two loops, guiding means secured to said tube between said spaced upper portions of said two loops and having a threaded opening through which said stem extends to threadedly connect said stem and said guiding means, respectively, whereby said stem is supported by said guiding means and rotation of said valve stem is effective to adjust said valve element, said guiding means being disposed above said nozzle between said spaced upper portions of said two loops so that said member is effective to spread the burner flame produced by burning said fuel and to direct part of said flame over said spaced upper loop portions, and means on said valve stem above said guiding means to facilitate turning said valve stem and said valve element.*

*11. A burner structure for gasifiable fuel comprising a housing adapted to contain said fuel and provided with an upper surface having a recess, a tubular body including a pair of end portions and a spiral-shaped portion intermediate said end portions, said spiral-shaped portion being seated in said recess, said end portions extending into and being fluidtightly connected to said housing, a nozzle having an opening and arranged on said spiral-shaped por-*

*tion, whereby said nozzle opening communicates with the interior of said housing through said end portions, a plate member supported by said spiral-shaped portion of said tubular body above said nozzle, needle means extending through said plate member and provided with means adjusting said needle means relative to said plate member and said nozzle, and operable means affixed to an end of said needle means remote from said nozzle and shaped to facilitate rotation of said operable means, thereby displacing said needle means with respect to said nozzle opening for regulating the flow of fuel from said housing.*

*12. A burner structure for gasifiable fuel comprising a housing for containing said fuel and provided with a recess, a tubular body including a pair of end portions and an intermediate portion including two spaced loop portions between said end portions, said intermediate portion being seated in said recess of said housing, said end portions extending into and being connected with said housing, a nozzle arranged on said intermediate portion and terminating in an upwardly directed discharge opening, whereby said discharge opening communicates with the interior of said housing through said end portions, a plate member supported above said nozzle by and between said two loop portions, said plate member being provided with an internally threaded aperture, a threaded valve stem engaging said aperture of said plate member and extending through the latter for cooperation with said discharge opening of said nozzle, and an end disk affixed to said valve stem remote from said nozzle, said end disk being provided with arms for rotation thereof and for displacing said valve stem with respect to said plate member to*

*adjust said valve stem with respect to said discharge opening, thereby regulating the flow of fuel from said housing.*

References Cited in the file of this patent or the original patent

UNITED STATES PATENTS

| | | |
|---|---|---|
| 56,530 | Child | July 24, 1866 |
| 270,690 | Ostlund | Jan. 16, 1883 |
| 386,534 | Goverts | July 24, 1888 |
| 390,660 | Gill et al. | Oct. 9, 1888 |
| 524,093 | Niemczik | Aug. 7, 1894 |
| 689,785 | Braun | Dec. 24, 1901 |
| 793,032 | Jeavons | June 20, 1905 |
| 1,045,995 | McHill | Dec. 3, 1912 |
| 1,213,412 | Rector | Jan. 23, 1917 |
| 1,281,056 | Nash | Oct. 8, 1918 |
| 1,299,263 | Tester | Apr. 1, 1919 |
| 1,469,714 | Broch | Oct. 2, 1923 |
| 1,664,410 | Greenwald et al. | Apr. 3, 1928 |
| 1,673,119 | McKesson | June 12, 1928 |
| 2,352,335 | Magg | June 27, 1944 |

FOREIGN PATENTS

| | | |
|---|---|---|
| 5,803 | Great Britain | of 1892 |
| 36,816 | Sweden | Aug. 2, 1912 |
| 42,244 | Sweden | Mar. 28, 1917 |
| 502,043 | France | Feb. 12, 1920 |
| 171,574 | Great Britain | Nov. 24, 1921 |
| 236,770 | Great Britain | July 16, 1925 |
| 65,416 | Norway | Nov. 2, 1942 |